United States Patent
Takahata et al.

(10) Patent No.: US 8,320,624 B2
(45) Date of Patent: Nov. 27, 2012

(54) CUSTOMER BEHAVIOR COLLECTION METHOD AND CUSTOMER BEHAVIOR COLLECTION APPARATUS

(75) Inventors: Masami Takahata, Tokyo (JP); Naoki Sekine, Tokyo (JP); Tomonori Ikumi, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 116 days.

(21) Appl. No.: 13/026,466

(22) Filed: Feb. 14, 2011

(65) Prior Publication Data

US 2011/0200226 A1 Aug. 18, 2011

(30) Foreign Application Priority Data

Feb. 17, 2010 (JP) ................................. 2010-032949

(51) Int. Cl.
*G06K 9/00* (2006.01)
*H04N 5/225* (2006.01)

(52) U.S. Cl. ........................................ 382/103; 348/169
(58) Field of Classification Search .................. 382/100, 382/103, 107, 236, 284; 348/142, 143, 152, 348/153, 154, 155, 169, 170, 171, 172
See application file for complete search history.

(56) References Cited

U.S. PATENT DOCUMENTS

| 8,139,818 | B2 * | 3/2012 | Takahata et al. ............. 382/103 |
| 2009/0003653 | A1 | 1/2009 | Takahata et al. |
| 2009/0195388 | A1 | 8/2009 | Ikumi et al. |
| 2009/0257624 | A1 | 10/2009 | Ikumi et al. |

FOREIGN PATENT DOCUMENTS

| JP | 2000-099826 | 4/2000 |
| JP | 2001-209795 | 8/2001 |
| JP | 2002-305717 | 10/2002 |
| JP | 2007-087208 | 4/2007 |
| JP | 2007-241786 | 9/2007 |
| JP | 2009-009394 | 1/2009 |
| JP | 2009-048229 | 3/2009 |
| JP | 2009-059042 | 3/2009 |

OTHER PUBLICATIONS

Japanese Office Action for Japanese Application No. 2010-032949 mailed on Nov. 8, 2011.

* cited by examiner

*Primary Examiner* — Abolfazl Tabatabai
(74) *Attorney, Agent, or Firm* — Turocy & Watson, LLP (57) ABSTRACT

According to one embodiment, a computer selects trajectory data on a person positioned in an image monitoring area from trajectory data on relevant persons. The computer selects a selling space image data obtained when the person corresponding to the trajectory data is positioned in the image monitoring area. The computer analyzes the selling space image data to extract a person image. The computer checks the person image extracted from the selling space image data against image data on each customer to search for customer image data obtained by taking an image of the person in the person image. The computer stores, upon detecting the customer image data obtained by taking an image of the person in the person image, identification information on transaction data stored in association with the customer image data, in association with identification information on the trajectory data.

12 Claims, 8 Drawing Sheets

| Camera ID | Frame number | Image taking time | Frame image |
|---|---|---|---|

FIG. 4

| Trajectory ID | Start frame number 1 | End frame number n | |
|---|---|---|---|

| | Frame 1 index (X1, Y1, H1, T1) | ——————— | Frame n index (Xn, Yn, Hn, Tn) |
|---|---|---|---|

FIG. 5

| Passage | Upper left coordinates | Lower right coordinates | Determination camera |
|---|---|---|---|
| PA1 | (X1, Y1) | (X2, Y2) | #1, #4 |
| PA2 | (X3, Y3) | (X4, Y4) | #4, #5, #6 |

| Management ID | Trajectory ID | Transaction ID | Duration |
|---|---|---|---|
| | | | |
| | | | |
| | | | |
| | | | |
| ⋮ | ⋮ | ⋮ | ⋮ |

CUSTOMER BEHAVIOR COLLECTION METHOD AND CUSTOMER BEHAVIOR COLLECTION APPARATUS

CROSS-REFERENCE TO RELATED APPLICATIONS

This application is based upon and claims the benefit of priority from Japanese Patent Application No. 2010-032949, filed on Feb. 17, 2010; the entire contents of which are incorporated herein by reference.

FIELD

Embodiments described herein relate generally to a technique for collecting behavioral data on a customer by associating trajectory data indicative of the customer's moving path with transaction data indicative of the contents of the customer's purchase.

BACKGROUND

A technique is known which collects behavioral data on a customer by associating trajectory data on the customer's moving path with transaction data indicative of the contents of the customer's purchase.

In the conventional technique, a computer tracks a customer's moving path until the customer stands at the end of a queue of customers waiting at a checkout lane for checkout. When the tracking ends, the computer stores identification information on the trajectory data indicative of the customer's moving path in a queue storage section according to the order in which the customers stand in the queue waiting for checkout. When the leading customer in the queue waiting for checkout checks out, the computer stores transaction data on the checked-out transaction in the queue storage section in association with the leading trajectory data identification information in the queue storage section. Thereafter, the computer deletes the leading trajectory data identification information.

In this conventional technique, the computer needs to track the customer's moving path until the customer stands in the queue waiting at the checkout lane for checkout. Thus, in stores with large floor spaces, what is called a trajectory recognition system needs to be constructed; the trajectory recognition system is a computer system configured to track customers' pathways all over the large floor space. This disadvantageously requires high facility and maintenance costs.

Some stores have only to be able to manageably associate a customer's behavior in a particular selling space with the contents of the customer's purchase. For example, the store may desire to know how a customer having purchased an article (a) behaves in a particular selling space (b). In such a case, it is in the selling space (b) that the customer's pathway needs to be tracked. The trajectory recognition system need not be constructed in the other selling spaces. The computer need not track the customer's moving path at least until the customer stands in the queue waiting at the checkout lane for checkout There has been a demand for a technique to associate trajectory data on a customer recognized by a trajectory recognition system constructed in a particular area of a store with transaction data on the same customer processed by a checkout apparatus arranged in an area different from the particular area.

DETAILED DESCRIPTION

In general, in a customer behavior collection method according to one embodiment, a computer selects trajectory data on a person positioned in an image monitoring area from trajectory data on relevant persons stored in a trajectory database. The computer selects, from a selling space image database, a selling space image data obtained when the person corresponding to the trajectory data selected from the trajectory database is positioned in the image monitoring area. The computer analyzes the selling space image data selected from the selling space image database to extract a person image. The computer checks the person image extracted from the selling space image data against image data on each customer stored in a customer image database to search for customer image data obtained by taking an image of the person in the person image. The computer stores, upon detecting the customer image data obtained by taking an image of the person in the person image, identification information on transaction data stored in association with the customer image data, in association with identification information on the trajectory data selected from the trajectory database.

(First Embodiment)

Figure 2:
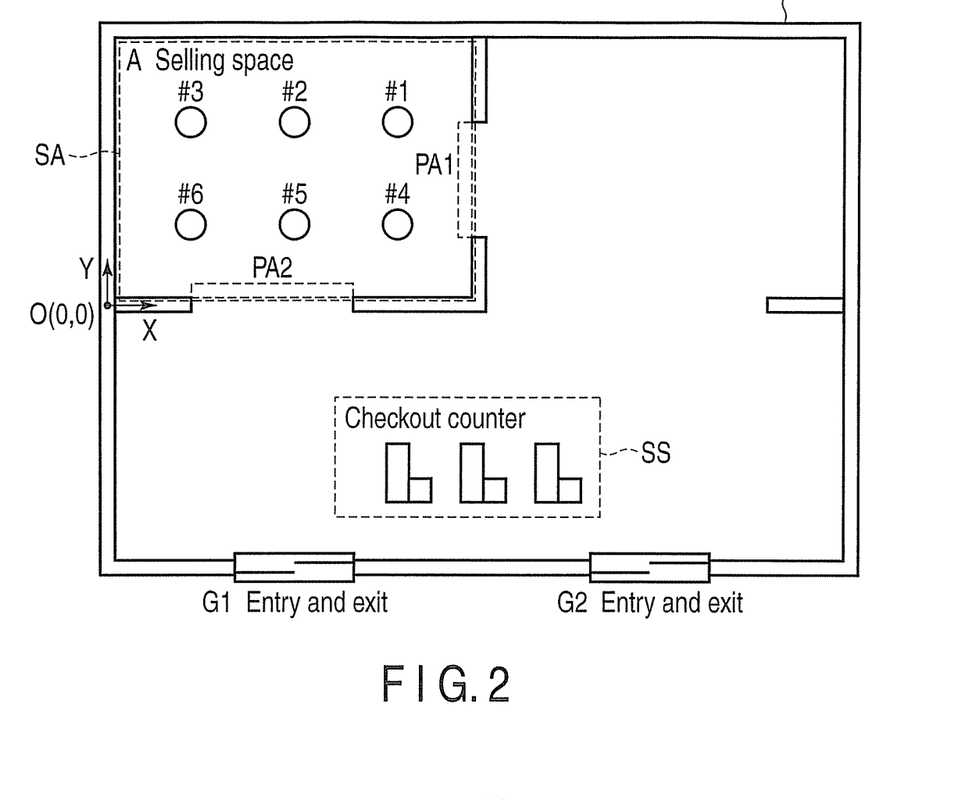
FIG. 2 is a diagram illustrating a store to which a system according to the embodiment is applied.

In the present embodiment, in a store 1 internally laid out as shown in FIG. 2, customers' behavior is collected by associating trajectory data indicative of the moving path of each customer stopping at a particular selling space A with transaction data indicative of the details of articles purchased by the customer.

A customer entering the store through an entry and exit G1 or G2 shops around in some selling spaces of the store 1 and places articles to be purchased in, for example, a shopping cart. Then, the customer goes to a checkout counter in the store 1 and pays for the purchased articles.

In the store 1, in which articles are sold as described above, the particular selling space A, located away from the checkout counter, is a trajectory recognition area for the customer according to the present embodiment. In the selling space A, a trajectory recognition system SA is constructed which recognizes the track of a person (customer) moving in the store A.

Figure 1:
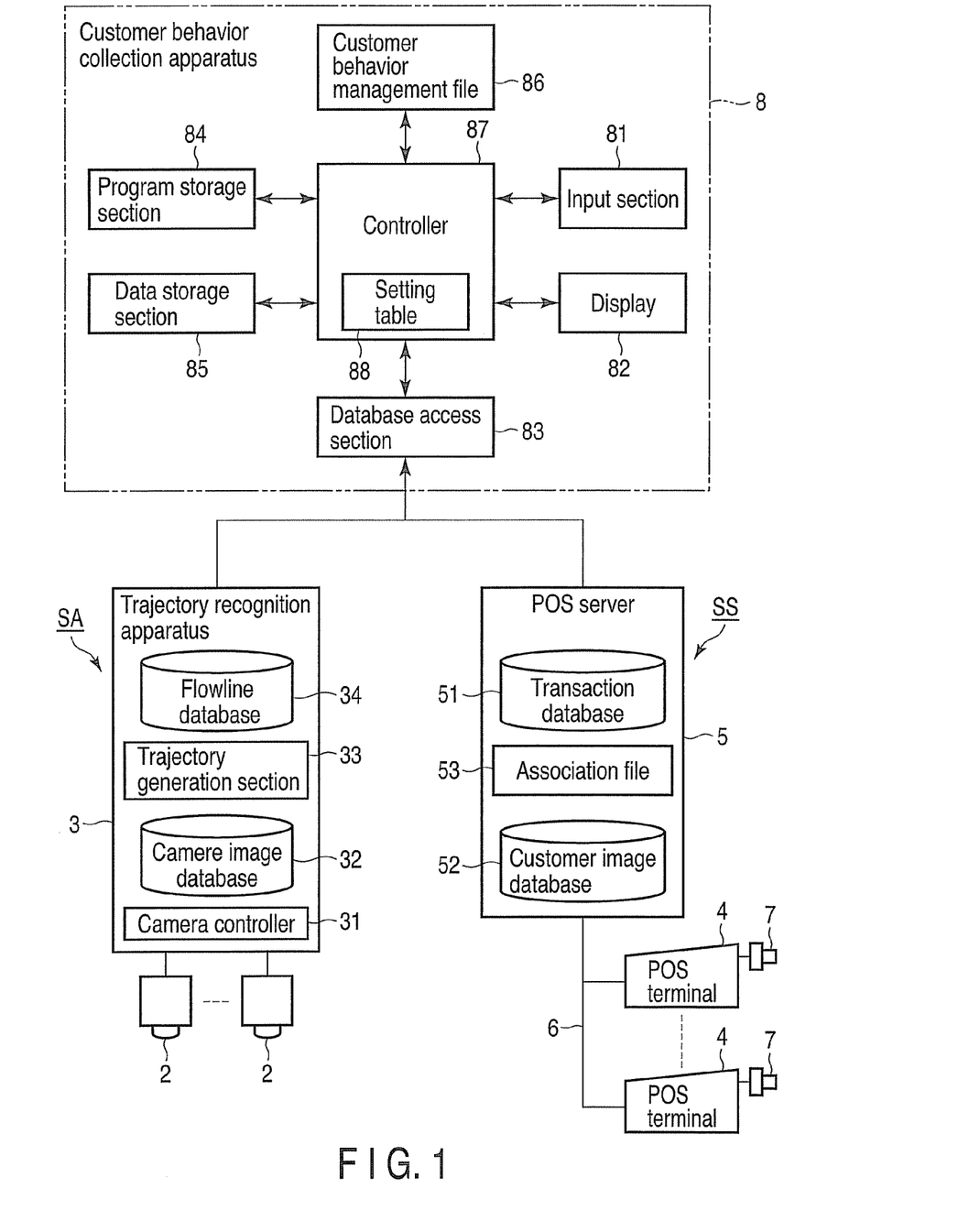
FIG. 1 is a block diagram showing an embodiment of a customer behavior collection system.

The trajectory recognition system SA is based on an image processing scheme using a camera. As shown in FIG. 1, the trajectory recognition system based on the image processing scheme comprises a plurality of cameras 2 and a trajectory recognition apparatus 3 mainly comprising a computer.

Each of the cameras 2 is a wide-angle camera such as a camera using a fish-eye lens or a camera using an omni-directional mirror. These cameras are used to follow the tracks of shoppers moving in the corresponding selling space A, by means of a volume intersection method. In the volume intersection method, for example, images of a customer's head are taken from a plurality of directions. Then, based on the position of the head in each of the images, the coordinate values of the head in a three-dimensional coordinate system are calculated; the three-dimensional coordinate system is appropriately installed in the space in the store. The number of cameras arranged in one monitoring area is not particularly limited. However, at least three cameras are required in order to increase the position detection accuracy of the volume intersection method.

Each of the cameras 2 repeats an image taking operation at a given period (for example, $1/15$ seconds) under the central control of a camera controller 31 provided in the trajectory recognition apparatus 3. The camera 2 transmits taken images (frame images) to the trajectory recognition apparatus 3. The trajectory recognition apparatus 3 comprises, in addition to a camera controller 31, a camera image database 32, a trajectory generation section 33, and a trajectory database 34.

Figure 4:
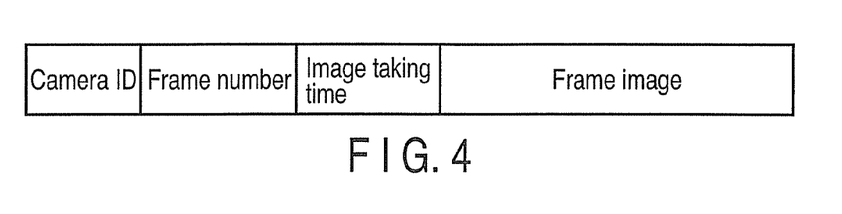
FIG. 4 is a schematic diagram showing the structure of image data stored in an image database according to the embodiment.

The camera image database 32 accumulates frame image data taken by each camera 2. FIG. 4 shows the structure of frame image data accumulated in the camera image database 32. As shown in FIG. 4, as the frame image data, a camera ID, a frame number, and an image taking time are stored in the camera image database 32 in association with one another.

The camera ID is an identification code for the camera 2 having taken the image data. Each camera 2 has a specific preset camera ID. The frame number is a serial number counted up from "1" every time the camera 2 takes a frame image. The frame numbers in the cameras 2 synchronize with one another under the control of the camera controller 3. The image taking date and time is the date and time of image taking.

The trajectory generation section 33 recognizes shoppers moving in the trajectory recognition area (selling space A) by carrying out image processing on frame image data accumulated in the camera image database 32. The trajectory generation section 33 generates trajectory data indicative of the shopper's track within the trajectory recognition area from a start point where the shopper enters the trajectory recognition area to an end point where the shopper exits the trajectory recognition area. The trajectory generation section 33 connects a plurality of separate trajectorys of the same shopper together into one trajectory by means of, for example, a technique disclosed in Jpn. Pat. Appln. KOKAI Publication No. 2009-009394.

Figure 5:
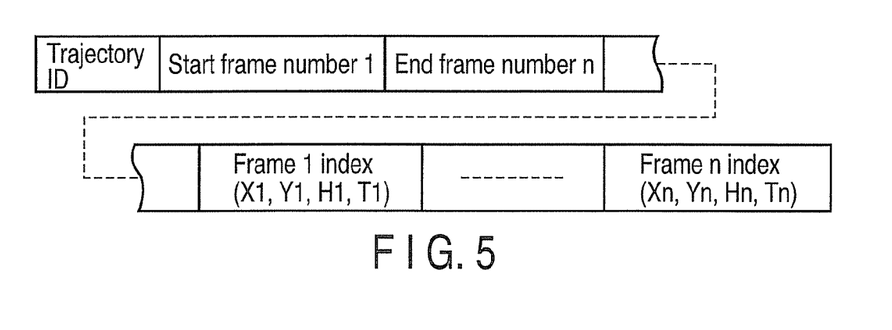
FIG. 5 is a schematic diagram showing the structure of trajectory data stored in a trajectory database.

Trajectory data generated for each shopper by the trajectory generation section 33 is accumulated in the trajectory database 34. FIG. 5 shows the structure of the trajectory data accumulated in the trajectory database 34. As shown in FIG. 5, the trajectory data is stored in the trajectory database 34 so that a trajectory ID is associated with other data. The trajectory ID is trajectory identification information used to identify each trajectory data. Every time the trajectory generation section 33 generates trajectory data on one shopper, the trajectory generation section 33 stores adds a specific trajectory ID to the trajectory data and stores the resultant trajectory data in the trajectory database 34.

The trajectory data comprises the frame number of a start point frame "1", the frame number of an end point frame "n" (n is an integer greater than 1), and index data for each frame from the start point frame "1" to the end point frame "n". The index data includes at least three-dimensional in-store coordinates (X, Y, H) and a frame image taking time T.

The start point frame number "1" is the frame number of the first frame image in which the shopper corresponding to the trajectory data is recognized. The image taking time of this frame image is the frame image taking time T1 of index data for the start point frame "1". The end point frame number "n" is the frame number of the last frame image in which the shopper is recognized. The image taking time of this frame image is the frame image taking time Tn of index data for the send point frame "n".

The in-store coordinates for each frame number indicate the position of the customer recognized from the frame image with the corresponding frame number and expressed in a three-dimensional world coordinate system (X, Y, H). In the present embodiment, in FIG. 2, the lower left corner of the selling space A is defined as the origin O (0, 0) of an X axis and a Y axis. The floor surface of the selling space A is defined as the origin of an H (Height) axis.

The cameras 2 of the trajectory recognition system SA are distributively mounted on a ceiling portion and the like in the selling space A. In the present embodiment, for convenience of description, six cameras 2 are mounted at the respective points shown at #1 to #6 in FIG. 2.

In the checkout counter, a POS (Point Of Sales) system SS is constructed so as to serve as a checkout system that settles transactions with shoppers. As shown in FIG. 1, the POS system SS comprises a plurality of POS terminals 4 and a POS server 5 configured to centrally control each of the POS terminals 4. The POS terminals 4 and the POS server 5 are connected together via a network 6 such as a LAN (Local Area Network).

Each POS terminal 4 is installed for a plurality of checkout lanes provided in the checkout counter. The POS terminal 4 is a computer terminal comprising I/O equipment such as a keyboard, a scanner, a display, and a printer. When information on an article purchased by a customer is input via the keyboard or the scanner, the POS terminal 4 registers sales data on the article in a memory. When information on all the articles purchased by one customer is input and a closing declaration operation for declaring closing of one transaction is performed, the POS terminal 4 activates the printer to print and issue a receipt. Furthermore, the POS terminal 4 generates transaction data using specifics data on purchased articles registered in the memory, payment data on the customer, and the like. The generated transaction data is transmitted to the POS server via the network 6.

The transaction data includes a transaction ID as identification information allowing this transaction data to be distinguished from the other transaction data. The transaction data also includes information on a transaction date and time. The transaction ID comprises a terminal ID and a transaction serial number. The terminal ID is identification information on each POS terminal 4. Each POS terminal 4 has a specific preset ID. The transaction serial number is counted up every time one POS terminal 4 generates transaction data. The transaction date and time corresponds to, for example, the time of execution of the closing declaration operation for the transaction.

Each POS terminal 4 comprises a monitoring camera 7 that normally uses a lens. The camera 7 takes images of customers' faces. When the closing declaration operation is performed, the POS terminal 4 loads customer image data already taken by the camera 7 by that point in time. The POS terminal 4 then transmits the customer image data to the POS server 5 together with transaction data. The customer image data includes a customer image ID as identification information that allows this customer image data to be distinguished from the other customer image data. The customer image ID comprises a camera ID and the above-described serial number. Each camera 7 has a specific preset ID.

Figure 3:
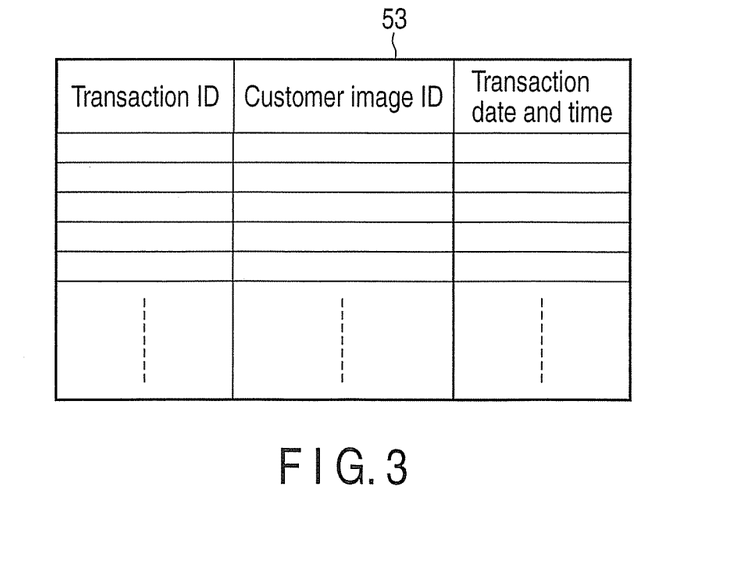
FIG. 3 is a schematic diagram showing the data structure of an association file provided in a POS server in a POS system.

The POS server 5 comprises a transaction database 51, a customer image database 52, and an association file 53. In the association file 53, the transaction ID is stored in association with the customer image ID and the information on the transaction date and time as shown in FIG. 3.

Upon receiving a pair of transaction data and customer image data from each POS terminal 4, the POS server 5 accumulatively saves the transaction data to the transaction database 51, while accumulatively saving the customer image data to the customer image database 52. Furthermore, the POS server 5 detects the transaction ID and the information on the transaction date and time in the transaction data, while detecting the customer image ID in the customer image data. The POS server 5 saves the customer image ID and the information on the transaction date and time to the association file 53.

The block diagram in FIG. 1 shows the configuration of essential part of the client behavior collection apparatus 8. As shown in FIG. 1, the customer behavior collection apparatus 8 comprises an input section 81, a display 82, a database access section 83, a program storage section 84, a data storage section 85, a customer behavior management file 86, and a controller, 87. The input section 81 comprises input devices such as a keyboard and a mouse. The display 82 comprises a display device such as a liquid crystal display or a CRT display. A display with a touch panel can be used both as the input section and as the display.

The database access section 83 can access the trajectory database 34 and camera image database 32 provided in the trajectory recognition apparatus 3 of the trajectory recognition system SA to read trajectory data and frame image data. Furthermore, the database access section 83 can access the transaction database 51 and customer image database 52 provided in the POS server 5 of the POS system SS to read transaction data and customer image data.

The program storage section 84 comprises ROM (Read Only Memory). The data storage section 85 comprises RAM (Random Access Memory). The customer behavior management file 86 comprises a recording medium such as a hard disk or a magnetooptic disk. The controller 87 mainly comprises CPU (Central Processing Unit). The customer behavior collection apparatus 8 configured as described above is implemented by computer equipment such as a personal computer.

A customer behavior collection program is mounted in the program storage section 84. The program allows the computer to carry out a process of selecting the trajectory data and transaction data on the same customer respectively from the trajectory data saved to the trajectory database 34 of the customer behavior recognition apparatus 3 and from the transaction data saved to the transaction database 51 of the POS server 5, and associating the trajectory data with the transaction data.

A procedure for associating trajectory data with transaction data will be specifically described. First, trajectory data stored in the trajectory database 34 will be described.

Trajectory data is stored in the trajectory database 34; the trajectory data is indicative of a customer's track in the selling space A from the start point where the customer enters the selling space A to the end point where the customer exits the selling space A. The customer can enter and exit the selling space A through a passage PA1 or PA2. Thus, the following four types of trajectory data are accumulated in the trajectory database 34.

1. Trajectory data indicating that the customer enters the selling space A through the passage PA1 and exits the selling space A through the passage PA1 again.
2. Trajectory data indicating that the customer enters the selling space A through the passage PA1 and exits the selling space A through the passage PA2.
3. Trajectory data indicating that the customer enters the selling space A through the passage PA2 and exits the selling space A through the passage PA2 again.
4. Trajectory data indicating that the customer enters the selling space A through the passage PA2 and exits the selling space A through the passage PA1.

In this manner, the customer moving in the selling space A passes through at least one of the passages PA1 and PA2. Thus, the customer behavior collection apparatus 8 sets each of the areas of the passages PA1 and PA2 in the image monitoring area. The customer behavior collection apparatus 8 first selects the trajectory data on a person positioned in the image monitoring area from trajectory data on relevant persons stored in the trajectory database 34 (trajectory selection stage).

Then, the customer behavior collection apparatus 8 selects, from the image database 32, selling space image data obtained when the person corresponding to the selected trajectory data is positioned in the image monitoring area (selling space image selection stage).

Then, the customer behavior collection apparatus 8 extracts a person image from the selected selling space image data (person image extraction stage).

Then, the customer behavior collection apparatus 8 checks the extracted person image against the image data on each customer stored in the customer image database 52 to search for customer image data obtained by taking an image of the person in the person image (customer image search stage).

Upon detecting the corresponding customer image data, the customer behavior collection apparatus 8 stores the identification information on the transaction data manageably stored in association with the customer image data, in association with the identification information on the selected trajectory data (association stage).

Thus, the trajectory data on the person stored in the trajectory database 34 is associated with the transaction data on the same person processed by the POS terminal 4.

Figure 6:
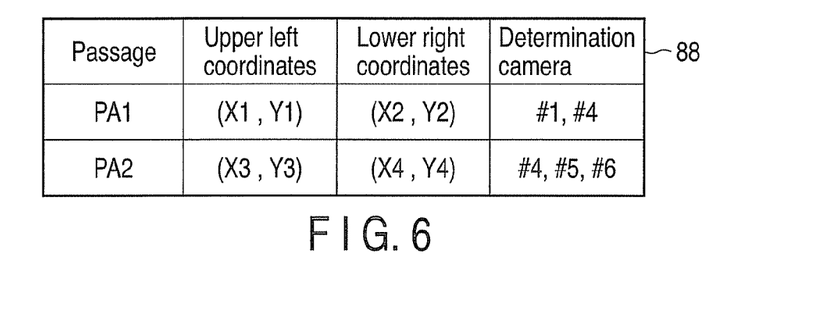
FIG. 6 is a schematic diagram showing an example of data in a setting table provided in the customer behavior collection apparatus.

To achieve such a customer behavior collection process, the customer behavior collection apparatus 8 comprises a setting table 88 with a data structure shown in FIG. 6. The setting table 88 may be stored in the memory built in the controller 87 or in the data storage section 85. The setting table 88 in FIG. 6 corresponds to the cameras arranged at the points #1 to #6 shown in FIG. 2.

In FIG. 2, the two cameras 2 of the trajectory recognition system SA which are arranged at #1 and #4 can take images of a rectangular area containing the passage PA1. The three cameras 2 of the trajectory recognition system SA which are arranged at #4, #5, and #6 can take images of a rectangular area containing the passage PA2. In association with information identifying a passage (item "passage"), the setting table 88 contains the two-dimensional coordinates (item "upper left coordinates") of the upper left corner of and the two-dimensional coordinates (item "lower right coordinates") of the lower right corner of the rectangular area containing the passage, and identification information (item "determination cameras") on cameras that can take images of the rectangular area.

Figure 7:
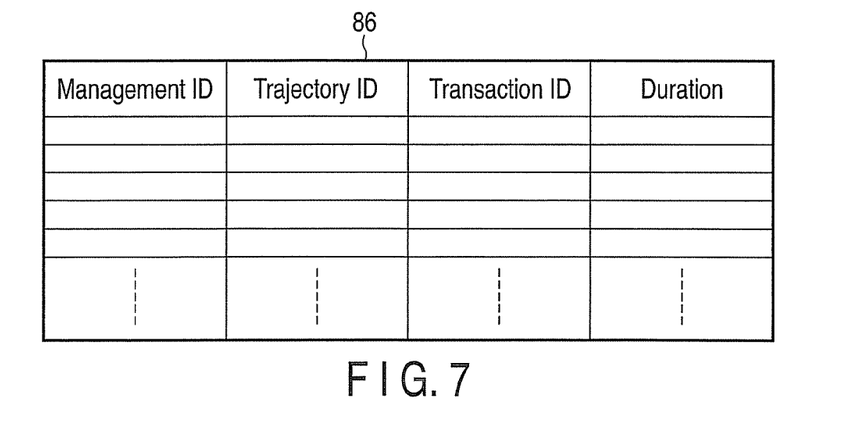
FIG. 7 is a schematic diagram showing the data structure of a customer behavior collection file provided in the customer behavior collection apparatus according to the embodiment.

Furthermore, the customer behavior collection apparatus 8 saves the associated trajectory data in a customer behavior management file 86. As shown in FIG. 7, the following can be recorded in the customer behavior management file 86: trajectory IDs used to identify trajectory data in association with specific management IDs, transaction IDs used to identify transaction data associated with the trajectory data, and duration information on a duration from the exit of a customer from the selling space A until a checkout operation on the customer is finished.

For example, when the input section 81 is operated to give an instruction to start a customer behavior collection operation, the customer behavior collection program is started. Thus, the controller 87 controls each section in accordance with a procedure illustrated in the flowcharts in FIG. 8 and FIG. 9.

Figure 8:
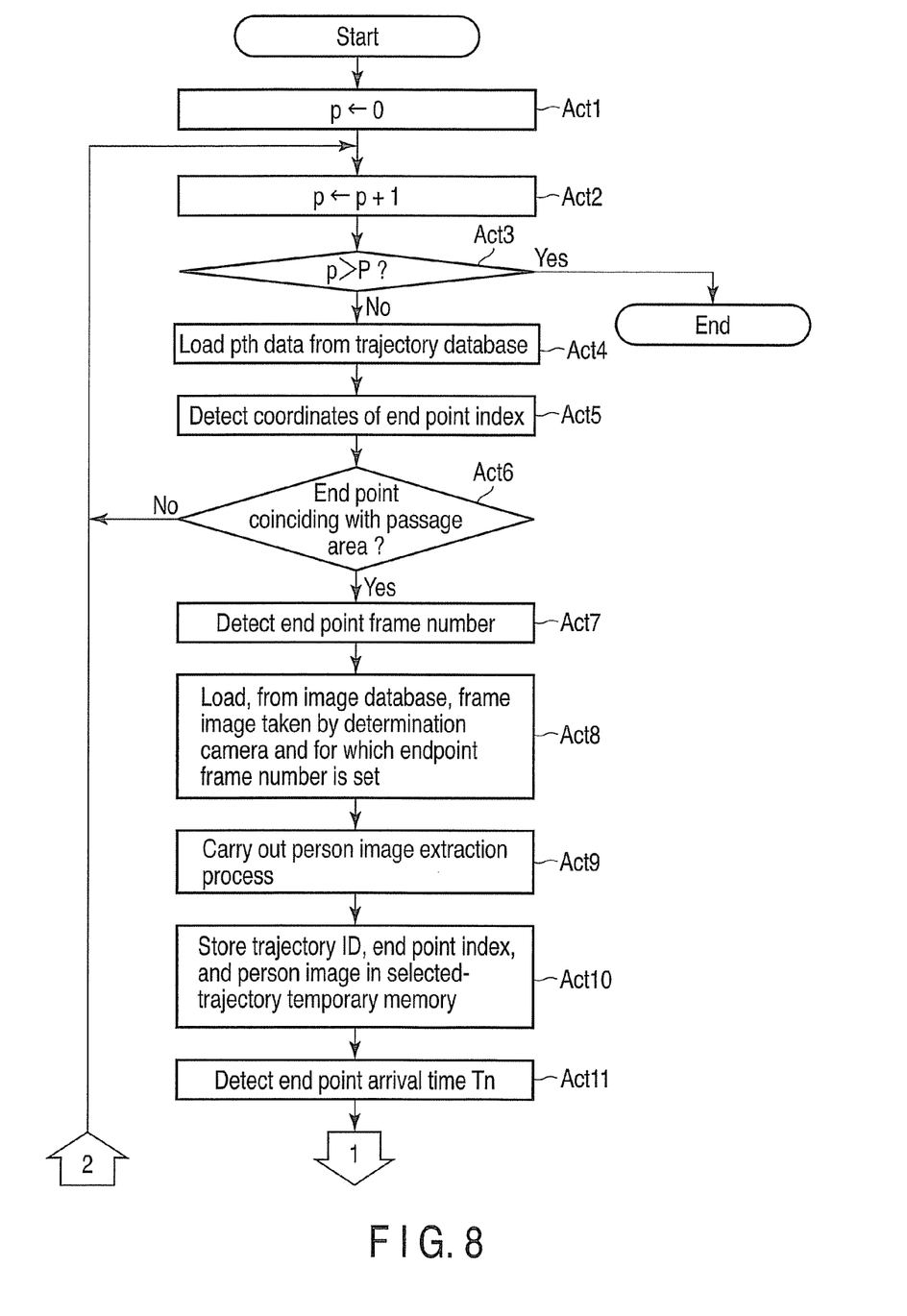
FIG. 8 is a flowchart illustrating the former half of a process procedure carried out by a controller of the customer behavior collection apparatus when a customer behavior collection program is started.

The controller 87 first resets a pointer p to "0" (Act 1). The controller 87 then increases the pointer p by "1" (Act 2). The controller 87 then determines whether or not the pointer p is greater than the total number P of trajectory data saved to the trajectory database 34 (Act 3).

At this moment, the pointer p is not greater than the total number P. The controller 87 loads the trajectory data indicated by the pointer p (this data is hereinafter referred to as the pth trajectory data) from the trajectory database 34 (Act 4). The controller 87 then detects the two-dimensional coordinates (Xn, Yn) of the end point index information in the pth trajectory data (Act 5).

Then, the controller 87 reads the data of the upper left coordinates and lower right coordinates set in association with the passages PA1 and PA2 from the setting table 88. The controller 87 checks these coordinate data against the two-dimensional coordinates (Xn, Yn) of the end point index information detected in the process in Act 5. The controller 87 determines whether or not the position indicated by the two-dimensional coordinates (Xn, Yn) is inside an area containing the passage PA1 or PA2 (Act 6: trajectory selection section).

The upper left coordinates and lower right coordinates of the area containing the passage PA1 are (X1, Y1) and (X2, Y2), respectively. Thus, when "Xn" and "Yn" in the end point two-dimensional coordinates (Xn, Yn) are in the relationships $X1 \geq Xn \geq X2$ and $Y1 \geq Yn \geq Y2$, respectively, the end point two-dimensional coordinates (Xn, Yn) are determined to be inside the area containing the passage PA1. Similarly, the upper left coordinates and lower right coordinates of the area containing the passage PA2 are (X3, Y3) and (X4, Y4), respectively. Thus, when "Xn" and "Yn" in the end point two-dimensional coordinates (Xn, Yn) are in the relationships $X3 \geq Xn \geq X4$ and $Y3 \geq Yn \geq Y4$, respectively, the end point two-dimensional coordinates (Xn, Yn) are determined to be inside the area containing the passage PA2.

If the position indicated by the end point two-dimensional coordinates (Xn, Yn) is determined not to be inside the area containing the passage PA1 or PA2, the controller 87 returns to the processing in Act 2. The controller 87 then increases the pointer p further by "1" and carries out the processing in Act 3 and the subsequent acts again.

If the position indicated by the end point two-dimensional coordinates (Xn, Yn) is determined to be inside the area containing the passage PA1 or PA2, the controller 87 acquires the end point frame number n from the pth trajectory data (Act 7). Then, the controller 87 acquires, from the setting table 88, information on the determination cameras set in association with one of the passages PA1 and PA2 for which the position of the end point two-dimensional coordinates (Xn, Yn) is determined to be inside the corresponding area. The controller 87 then loads one of the frame image data taken by the determination camera which has been saved after being assigned the end point frame number n detected in the process in Act 7 (Act 8: image selection section).

Then, the controller 87 analyzes the frame image data with the end point frame number n loaded from the image database 32 to extract a person image from the image data (Act 9: person image extraction section). When a person image is successfully extracted, the controller 87 generates one record that associates the trajectory ID of the pth trajectory data and the frame n with the data on the extracted person image. The controller 87 stores the record in a selected-trajectory temporary memory on the data storage section 8 (Act 10). Furthermore, the controller 87 detects the end point arrival time Tn in the frame n index information stored in the selected-trajectory temporary (Act 11).

Then, the controller 87 resets a pointer q to "0" (Act 12). The controller 87 then increases the pointer q by "1" (Act 13). The controller 87 then determines whether or not the pointer q is greater than the total number Q of data stored in the association file 53 (Act 14).

Figure 9:
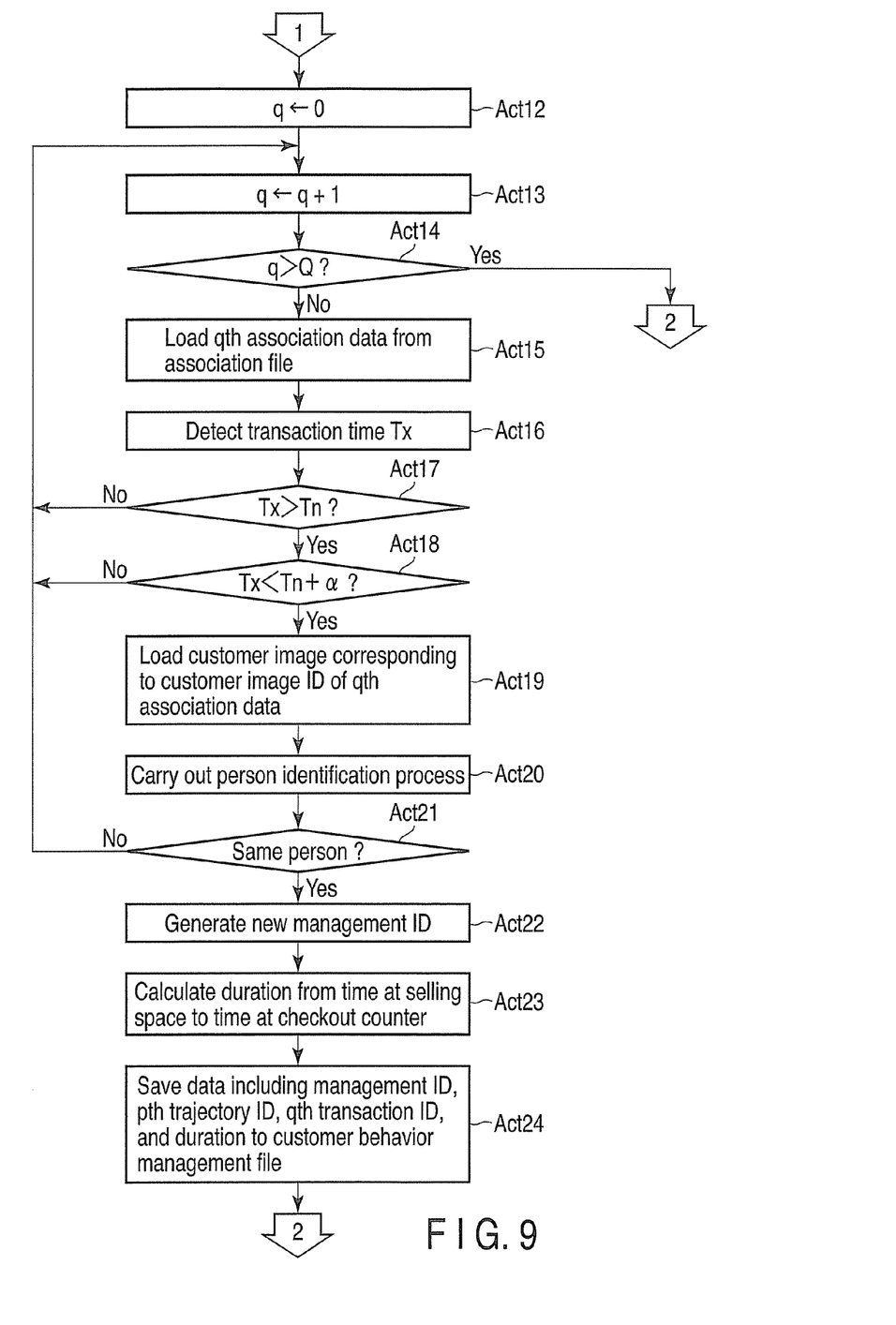
FIG. 9 is a flowchart illustrating the latter half of the process procedure carried out by the controller of the customer behavior collection apparatus when the customer behavior collection program is started.

The pointer q is initially not greater than the total number Q. Thus, the controller 87 loads the association data indicated by the pointer q (this data is hereinafter referred to as the qth association data) (Act 15). The controller 87 then detects a transaction time Tx in the qth association data (Act 16).

Then, the controller 87 determines whether or not the transaction time Tx is later than the end point arrival time Tn detected in the process in Act 11 (Act 17). If the transaction time Tx is earlier than the end point arrival time Tn (NO in Act 17), the controller 87 returns to Act 13. The controller 87 then increases the pointer q further by "1" and carries out the processing in Act 14 and the subsequent acts.

If the transaction time Tx is later than the end point arrival time Tn (YES in Act 17), the controller 87 determines whether or not the transaction time is earlier than a time Tn+α equal to the end point arrival time Tn plus a preset addition time α (Act 18). The addition time α is, for example, the average stay duration for which a shopper stays in the store 1.

If the transaction time Tx is equal to or later than the time Tn+α equal to the end point arrival time Tn plus the addition time α (NO in Act 18), the controller returns to the processing in Act 13. The controller 87 then increases the pointer q further by "1" and carries out the processing in Act 14 and the subsequent acts.

If the transaction time Tx is earlier than the time Tn+α equal to the end point arrival time Tn plus the addition time α (YES in Act 18), the controller 87 acquires a customer image ID from the qth association data. The controller 87 then loads image data for which the customer image ID is set, from the customer image database 52 (Act 19).

Thereafter, the controller 87 carries out a person identification process (Act 20). That is, the controller 87 checks data on the person image stored in the selected-trajectory temporary memory against the customer image data loaded from the customer image database 52 in Act 19 described above. The controller 87 thus determines whether or not the customer image data has been obtained by taking an image of the person identified by the person image data (customer image search section).

If the person identification process determines that the person in the person image and the customer in the customer image data are not the same (NO in Act 21), the controller 87 returns to the processing in Act 16. The controller 87 then increases the pointer q further by "1" and carries out the processing in Act 14 and the subsequent acts.

In contrast, if the person identification process determines that the person in the person image and the customer in the customer image data are the same (YES in Act 21), the controller 87 generates a new management ID. Furthermore, the controller 87 calculates the elapsed time from the end point arrival time Tn to the transaction time Tx (Act 23). The controller 87 then generates one record from data including the new management ID, the trajectory ID of the pth trajectory data, the transaction ID of the qth data, and the duration. The controller 87 then saves the record to the customer behavior management file 86 (Act 24: association section).

When the processing in Act 24 finishes or if the pointer q is greater than the total number Q of the data stored in the association file 53 (YES in Act 14), the controller 87 returns to the processing in Act 2. The controller 87 then increases the pointer p further by "1" and carries out the processing in Act 3 and the subsequent acts. When the pointer 9 is greater than the total number P of the trajectory data stored in the trajectory database 34, the customer behavior collection program finishes.

In the processing in Act 9 in FIG. 8, undistorted person images are extracted from the camera image data utilizing a well-known technique disclosed in, for example, Jpn. Pat. Appln. KOKAI Publication No. 2001-209795 or Jpn. Pat. Appln. KOKAI Publication No. 2009-059042 laid open in Japan.

Similarly, in the processing in Act 20 in FIG. 9, the person identification process of comparing two extracted person images with each other to determine whether or not the persons are the same is carried out utilizing a well-known pattern recognition technique or a color histogram similarity determination technique disclosed in, for example, Jpn. Pat. Appln. KOKAI Publication No. 2002-305717 or Jpn. Pat. Appln. KOKAI Publication No. 2009-059042 laid open in Japan.

As described above, in the present embodiment, trajectory data indicative of the track of each person moving in the selling space A is stored in the trajectory database 34 of the trajectory recognition apparatus 3. The camera image data taken by the cameras 2 of the trajectory recognition system SA arranged at the respective positions in the selling space A is stored in the image database 32 together with the corresponding image taking time information. Thus, when the rectangular area inside the passages PA1 and PA2 to the selling A is defined to be the image monitoring area, at least the selling space image data obtained by taking images of the image monitoring area is stored in the image database 32 together with the corresponding image taking time information.

The transaction data indicative of the contents of transactions processed by each POS terminal 4 is stored in the transaction database 51 of the POS server 5. The image data on the customers involved in the transactions processed by each POS terminal 4 is stored in the customer image database 52. As data allowing transaction data on a customer to be associated with image data on the same customer, the customer image ID and transaction date and time information are stored in the association file 53 in association with the transaction ID.

When the customer behavior collection program mounted in the customer behavior collection apparatus 8 is started, the customer behavior collection apparatus 8 first carries out the processing in Act 1 to Act 4 in FIG. 8 to select each trajectory data from the trajectory database 34 in order. Then, the customer behavior collection apparatus 8 carries out the processing in Act 5 and Act 6 to determine whether or not the end point of the selected trajectory data is positioned within the image monitoring area. If the end point is positioned within the image monitoring area, the customer behavior collection apparatus 8 carries out the processing in Act 7 to Act 10 to acquire, from the image database 32, image data obtained by taking images of the image monitoring area when the end point is positioned within the image monitoring area. The customer behavior collection apparatus 8 then analyzes the acquired selling space image data to extract person images.

Then, the customer behavior collection apparatus 8 carries out the processing in Act 11 to Act 19 to detect the image data on each of the customers involved in the transactions processed by each POS terminal 4 after the detection of the end point of the selected trajectory data and before the elapse of the predetermined time α. The customer behavior collection apparatus 8 carries out the processing in Act 20 to Act 21 to search for customer image data obtained by taking an image of the person in the person image extracted from the selling space image data. Upon detecting the corresponding customer image data, the customer behavior collection apparatus 8 carries out the processing in Act 22 to Act 24 to store the trajectory ID of the trajectory data with and transaction ID indicative of the transaction data on the customer identified by the customer image data, in the customer behavior management file 86 so that the trajectory data is associated with the transaction data.

Thus, in the present embodiment, the trajectory data on a person stored in the trajectory database 34 is associated with the transaction data on the same person processed by the POS terminal 4.

As described above, the present embodiment allows easy collection of information on customer behavior in which the behavior of a person entering the particular selling space A in the store 1 is associated with the contents of articles purchased by the customer in the store. In this case, the trajectory recognition system SA configured to obtain trajectory data indicative of the customer's behavior need not be constructed all over the store but only in the selling space A. This is effective for saving facility and maintenance costs compared to the case where the trajectory recognition system SA is constructed all over the store.

Furthermore, in the present embodiment, in Act 17 in FIG. 9, when the transaction time Tx is later than the end point arrival time Tn, the customer behavior collection apparatus 8 determines in Act 18 whether or not the transaction time Tx is earlier than the time Tn+α equal to the end point arrival time Tn plus the addition time α. If the transaction time Tx is equal to or later than the time Tn+α, the controller 87 then increases the pointer q further by "1" and carries out the processing in Act 14 and the subsequent acts again. Thus, the processing in Act 19 and the subsequent acts is carried out on the transaction data with the transaction time Tx later than the end point arrival time Tn and earlier than the time Tn+α.

Here, when the addition time α is the average stay time of the shoppers in the store 1, a customer rarely fails to check out even though the addition time α has elapsed since the exit of the customer from the selling space A, while the customer stays in the store 1. Thus, such a temporal limitation as described above enables a reduction in the number of processes carried out in and after Act 19. Hence, the present embodiment is effective for reducing the load on the controller 87.

(Second Embodiment)

Now, a second embodiment will be described with reference to FIG. 10 to FIG. 12. The second embodiment is also applied to a store 1 internally laid out as shown in FIG. 2. A trajectory recognition system SA based on an image processing scheme using cameras is constructed in a selling space A.

The second embodiment is different from the first embodiment in a part of a process procedure carried out by a controller 87 when a customer behavior collection program is started. Thus, FIG. 1 to FIG. 7 described for the first embodiment are also referenced for the second embodiment. The same components of the second embodiment as those of the first embodiment are denoted by the same reference numerals.

Figure 10:
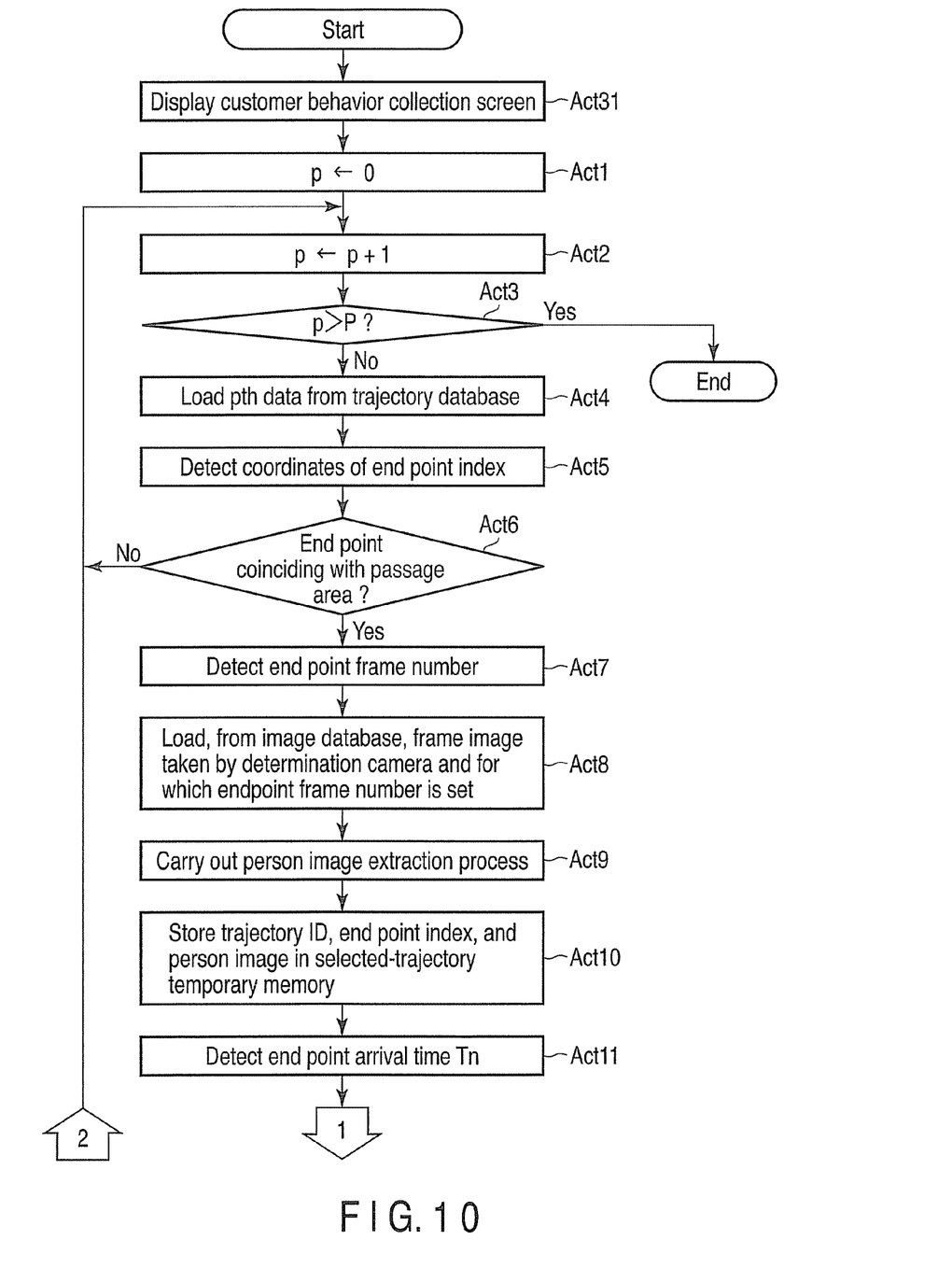
FIG. 10 is a flowchart illustrating the former half of a process procedure carried out by the controller of the customer behavior collection apparatus when the customer behavior collection program is started, according to a second embodiment.
Figure 11:
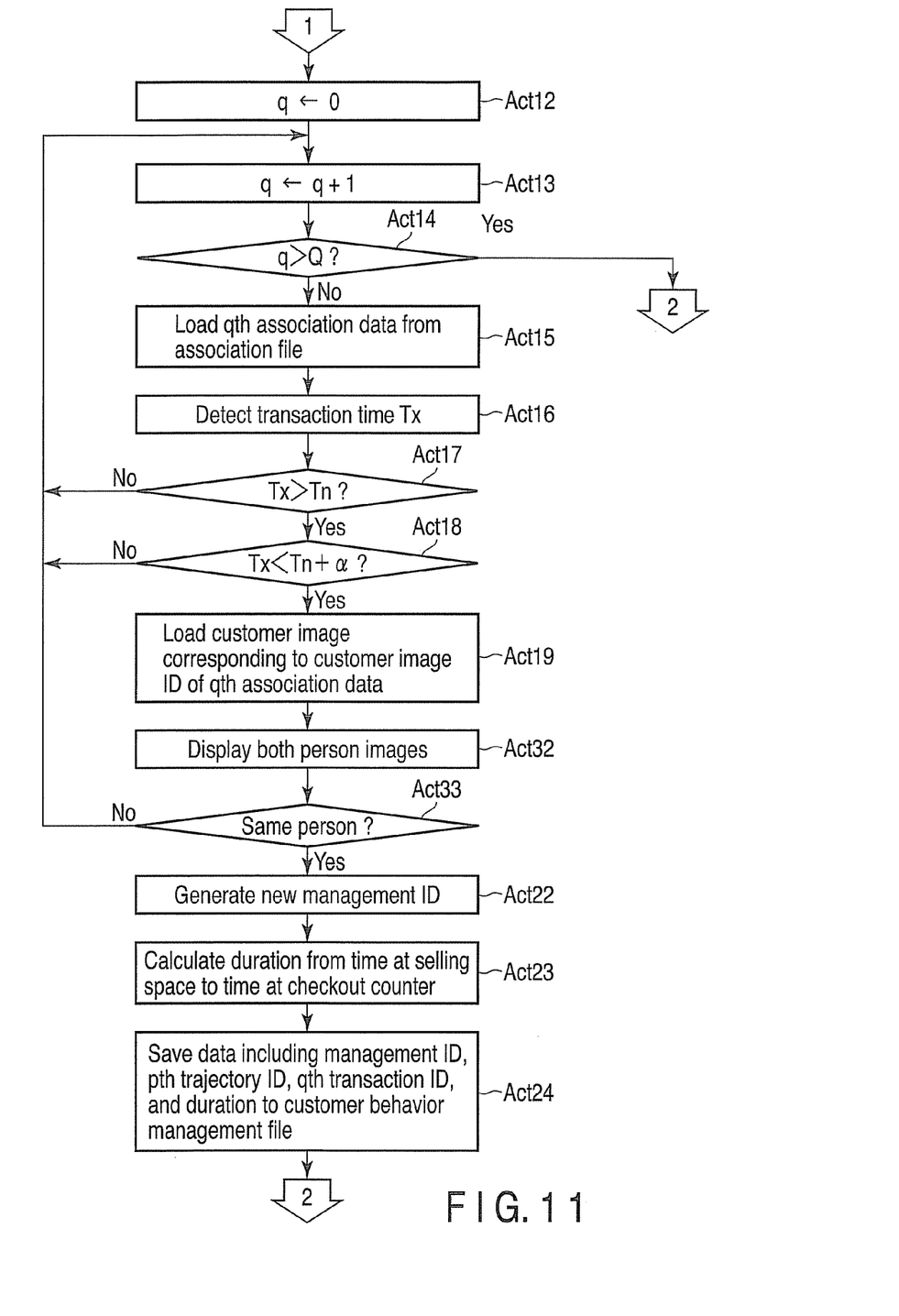
FIG. 11 is a flowchart illustrating the latter half of the process procedure carried out by the controller of the customer behavior collection apparatus when the customer behavior collection program is started, according to the second embodiment.

FIG. 10 and FIG. 11 are flowcharts illustrating the process procedure carried out by the controller 87 when the customer behavior collection program is started.

The controller 87 first allows a display 82 to display a trajectory association screen 9 (Act 31).

Figure 12:
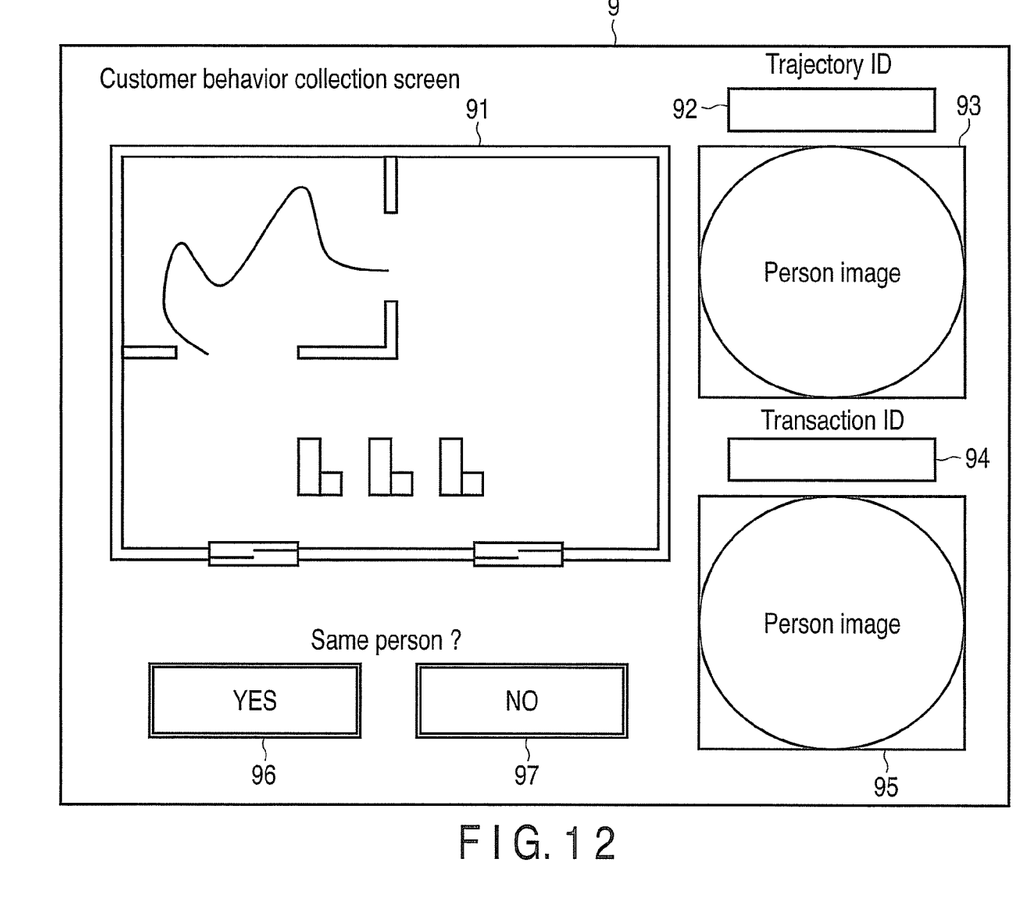
FIG. 12 is a schematic diagram showing an example of a customer behavior collection screen displayed on a display of the customer behavior collection apparatus according to the second embodiment.

FIG. 12 shows an example of the trajectory association screen 9. As shown in FIG. 12, the trajectory association screen 9 displays a trajectory area 91, a trajectory ID area 92, a first image area 93, a transaction ID area 94, a second image area 95, and button images of a "YES" button 96 and a "NO" button 97. An input operation can be performed on each of the button images via an input section 81.

Then, the controller 87 carries out the processing in ACT 1 to ACT 19 according to the first embodiment.

That is, the controller 87 detects the pth trajectory data positioned in the area of a passage PA1 or PA2 in the trajectory database 34. The controller 87 then extracts a person image from an image of the passage PA1 or PA2 taken when the end point of the pth trajectory data is positioned in the area of the passage PA1 or PA2.

Furthermore, the controller 87 sequentially selects, from an association file 53, the qth association data obtained at a transaction time Tx that is within a predetermined time α after the end point arrival time Tn of the pth trajectory data. Every time the controller 87 selects the pth association data, the controller 87 acquires customer image data corresponding to a customer image ID included in the qth association data, from a customer database 52.

When the processing in Act 19 thus finishes, the controller 87 updates the display contents of the trajectory association screen 9 (Act 32). That is, the controller 87 allows a trajectory to be displayed in the trajectory area 91 in accordance with trajectory data loads in the processing in Act 4. The controller 87 allows the trajectory ID of the trajectory data to be displayed in the trajectory ID area 92. The controller 87 allows a person image extracted in the processing in Act 9 to be displayed in the first image area 93. The controller 87 allows the transaction ID of the qth association data loaded in the processing in Act 15 to be displayed in the transaction ID area 94. The controller 87 allows a customer image in the customer image data loaded in the processing in Act 19 to be displayed in the second image area 95.

In this state, the controller 87 waits for an input operation to be performed on one of the "YES" button 96 and the "NO" button 97 (Act 33: association declaration acceptance section).

Here, if an input operation is performed on the "NO" button 97 via the input section 81 (NO in Act 331), the controller 87 returns to the processing in Act 13. The controller 87 then increases the pointer q further by "1" and carries out the processing in Act 14 and the subsequent acts.

On the other hand, if an input operation is performed on the "YES" button 96 via the input section 81 (YES in Act 331), the controller 87 carries out the same processing as that in Act 22 to Act 24. That is, the controller 87 generates one record from data including a new management ID, the trajectory ID of the pth trajectory data, the transaction ID of the qth data, and a duration. The controller 87 then saves the record to a customer behavior management file 86 (Act 24: association section).

As described above, in the second embodiment, the person image in the pth data is displayed in the first image area 93 in the trajectory association screen 9. The person image in the qth data is displayed in the second image area 95 in the trajectory association screen 9. Thus, the operator visually compares the person images displayed in the image areas 93 and 95, respectively, to determine whether or not the persons in the person images are the same.

If the persons in the person images are not the same, the operator operates the "NO" button 97. Then, the display of the second image area 93 is updated to the person image in the next qth data. In this manner, the operator repeatedly operates the "NO" button 97 until the same person as that in the image displayed in the first image area 93 is displayed in the second image area 95. When an image of the same person is displayed in the second image area 93, the operator operates the "YES" button 96 to indicate an association declaration. Then, the trajectory ID of the pth data is associated with the transaction ID of the qth data.

Even in the second embodiment configured as described above, the trajectory data on a customer moving in the selling space A can be associated with the transaction data indicative of the contents of the customer's transaction, as is the case with the first embodiment. Furthermore, the operator uses camera images to visually determine whether or not the persons in the two images are the same. Thus, the second embodiment is more reliable.

The present invention is not limited to the as-described embodiments. In practice, the components of the embodiments may be modified without departing from the spirits of the present invention.

For example, in the above-described embodiments, in Act 17 in FIG. 9, when the transaction time Tx is later than the end point arrival time Tn, the apparatus determines in Act 18 whether or not the transaction time Tx is earlier than the time Tn+α equal to the end point arrival time Tn plus the addition time α. In other embodiments, the predetermined time α may be assumed to be infinite and the determination process in Act 18 may be omitted. In this case, in spite of an increase in the processing load on the controller 87, effects and advantages similar to those of the present embodiments can of course be obtained.

Furthermore, in the above-described embodiments, the image monitoring area is the area containing the passage to the selling space. If a passage through which a great number of customers walk is present inside the selling space, then in other embodiments, the area of the passage may be the image monitoring area. That is, the image monitoring area may be any place with cameras installed therein and providing camera image data from which an image of the person corresponding to the trajectory data can be extracted.

Furthermore, in the above-described embodiments, the trajectory recognition system SA adopts the image processing scheme using cameras. Other embodiments adopt a trajectory recognition system SA based on a radio tag tracking scheme. In this case, the selling space A requires cameras taking images of the area containing the passages PA1 and PA2. The trajectory recognition apparatus stores the frame image data from each camera in the image database in association with the time information. The customer behavior collection apparatus extracts a person image from the frame image data obtained at the end point arrival time of the trajectory data with the end point corresponding to each passage area. The customer behavior collection apparatus then carries out a person identification process between the person image and the customer image data associated with the transaction data. This allows effects similar to those of the above-described embodiments to be exerted.

However, when the image processing scheme using cameras is adopted as is the case with the above-described embodiments, cameras for trajectory recognition can also be used, without any change, as cameras for acquiring image data used to make determination for association of the trajectory. Therefore, the embodiments are effective for reducing system costs.

Furthermore, in the above-described embodiments, the customer behavior collection program is pre-stored in the program storage section 84. However, the program may be downloaded into the customer behavior collection apparatus 8 or may be stored in a recording medium via which the program can be installed in the customer behavior collection apparatus 8. The recording medium may be in any form provided that programs can be stored in the recording medium and that the recording medium is computer-readable; the recording medium may be CD-ROM or the like. Additionally, functions thus obtained by installation or downloading may be implemented through cooperation with OS (Operating System) inside the computer.

While certain embodiments have been described, these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A customer behavior collection method using a computer configured to access each of a trajectory database configured to store trajectory data indicative of a track of each person moving in a selling space, a selling space image database configured to store, together with an image taking time, selling space image data obtained by taking an image of inside of an image monitoring area which is at least a part of the selling space, and a customer image database configured to store image data on a customer taken every time a checkout apparatus checks out a transaction, the computer associating trajectory data on a person with transaction data on the same person processed by the checkout apparatus, the method comprising:
the computer selecting trajectory data on a person positioned in the image monitoring area from trajectory data on relevant persons stored in the trajectory database;
the computer selecting, from the selling space image database, selling space image data obtained when the person corresponding to the trajectory data selected from the trajectory database is positioned in the image monitoring area;
the computer analyzing the selling space image data selected from the selling space image database to extract a person image;
the computer checking the person image extracted from the selling space image data against image data on each customer stored in the customer image database to search for customer image data obtained by taking an image of the person in the person image; and
the computer storing, upon detecting the customer image data obtained by taking an image of the person in the person image, identification information on transaction data stored in association with the customer image data, in association with identification information on the trajectory data selected from the trajectory database.

2. The method of claim 1, wherein the computer searches the customer image data taken during a transaction checked out within a preset time after the image taking time of the selling space image data selected from the selling space image database, for the person image extracted from the selling space image data.

3. A customer behavior collection method using a computer configured to access each of a trajectory database configured to store trajectory data indicative of a track of each person moving in a selling space, a selling space image database configured to store, together with an image taking time, selling space image data obtained by taking an image of inside of an image monitoring area which is at least a part of the selling space, and a customer image database configured to store image data on a customer taken every time a checkout apparatus checks out a transaction, the computer associating trajectory data on a person with transaction data on the same person processed by the checkout apparatus, the method comprising:
the computer selecting trajectory data on a person positioned in the image monitoring area from trajectory data on relevant persons stored in the trajectory database;
the computer selecting, from the selling space image database, selling space image data obtained when the person corresponding to the trajectory data selected from the trajectory database is positioned in the image monitoring area;
the computer allowing a display to display a selling space image included in the selling image data selected from the selling image database;
the computer selecting image data on each customer from the customer image database;
the computer allowing the display to display a customer image included in the customer image data selected from the customer image database;
the computer accepting a declaration of association between the trajectory data and the customer image data; and
the computer storing, upon accepting the association declaration, identification information on transaction data manageably stored in association with the customer image data selected from the customer image database, in association with identification information on the trajectory data selected from the trajectory database.

4. The method of claim 3, wherein the computer selects one of the customer image data taken during a transaction checked out within a preset time after the image taking time of the selling space image data selected from the selling space image database, and allows the display to display the selected customer image data.

5. A customer behavior collection apparatus comprising:
a database access section configured to access each of a trajectory database configured to store trajectory data indicative of a track of each person moving in a selling space, a selling space image database configured to store, together with an image taking time, selling space image data obtained by taking an image of inside of an image monitoring area which is at least a part of the selling space, and a customer image database configured to store image data on a customer taken every time a checkout apparatus checks out a transaction;
a trajectory selection section configured to select trajectory data on a person positioned in the image monitoring area from trajectory data on relevant persons stored in the trajectory database;
a selling space image selection section configured to select, from the selling space image database, selling space image data obtained when the person corresponding to the trajectory data selected from the trajectory database is positioned in the image monitoring area;
a person image extraction section configured to extract a person image from the selling space image data selected by the selling space image selection section;
a customer image search section configured to check the person image extracted by the person image extraction section against image data on each customer stored in the customer image database to search for customer image data obtained by taking an image of the person in the person image; and
an association section configured to, when the customer image search section detects the customer image data obtained by taking an image of the person in the person image, store identification information on transaction data stored in association with the customer image data, in association with identification information on the trajectory data selected by the trajectory selection section.

6. The apparatus of claim 5, wherein the customer image search section searches the customer image data taken during a transaction checked out within a preset time after the image taking time of the selling space image data selected from the selling space image database, for the person image extracted from the selling space image data.

7. A customer behavior collection apparatus comprising:
a database access section configured to access each of a trajectory database configured to store trajectory data indicative of a track of each person moving in a selling space, a selling space image database configured to store, together with an image taking time, selling space image data obtained by taking an image of inside of an image monitoring area which is at least a part of the selling space, and a customer image database configured to store image data on a customer taken every time a checkout apparatus checks out a transaction;
a trajectory selection section configured to select trajectory data on a person positioned in the image monitoring area from trajectory data on relevant persons stored in the trajectory database;
a selling space image selection section configured to select, from the selling space image database, selling space image data obtained when the person corresponding to the trajectory data selected from the trajectory database is positioned in the image monitoring area;
a customer image selection section configured to select image data on each customer from the customer image database;
a customer image display configured to allow the display to display a customer image included in the customer image data selected by the customer image selection section;
an association declaration acceptance section configured to accept a declaration of association between the trajectory data and the customer image data; and
an association section configured to, when the association declaration is accepted, store identification information on transaction data stored in association with the customer image data selected by the customer image selection section, in association with identification information on the trajectory data selected by the trajectory selection section.

8. The apparatus of claim 7, wherein the customer image selection section selects one of the customer image data taken during a transaction checked out within a preset time after the image taking time of the selling space image data selected by the selling space image selection section, and allows the display to display the selected customer image data.

9. A non-transitory computer readable medium in which a program is stored, the program allowing a process routine to be executed by a computer configured to access each of a trajectory database configured to store trajectory data indicative of a track of each person moving in a selling space, a selling space image database configured to store, together with an image taking time, selling space image data obtained by taking an image of inside of an image monitoring area which is at least a part of the selling space, and a customer image database configured to store image data on a customer taken every time a checkout apparatus checks out a transaction, the process routine comprising:
selecting trajectory data on a person positioned in the image monitoring area from trajectory data on relevant persons stored in the trajectory database;
selecting, from the selling space image database, selling space image data obtained when the person corresponding to the trajectory data selected from the trajectory database is positioned in the image monitoring area;
analyzing the selling space image data selected from the selling space image database to extract a person image;
checking the person image extracted from the selling space image data against image data on each customer stored in the customer image database to search for customer image data obtained by taking an image of the person in the person image; and
storing, upon detecting the customer image data obtained by taking an image of the person in the person image, identification information on transaction data stored in association with the customer image data, in association with identification information on the trajectory data selected from the trajectory database.

10. The non-transitory computer readable medium of claim 9, wherein the customer image data taken during a transaction checked out within a preset time after the image taking time of the selling space image data selected from the selling space image database is searched for the person image extracted from the selling space image data.

11. A non-transitory computer readable medium in which a program is stored, the program allowing a process routine to be executed by a computer configured to access each of a trajectory database configured to store trajectory data indicative of a track of each person moving in a selling space, a selling space image database configured to store, together with an image taking time, selling space image data obtained by taking an image of inside of an image monitoring area which is at least a part of the selling space, and a customer image database configured to store image data on a customer taken every time a checkout apparatus checks out a transaction, the process routine comprising:
- selecting trajectory data on a person positioned in the image monitoring area from trajectory data on relevant persons stored in the trajectory database;
- selecting, from the selling space image database, selling space image data obtained when the person corresponding to the trajectory data selected from the trajectory database is positioned in the image monitoring area;
- allowing a display to display a selling space image included in the selling image data selected from the selling image database;
- selecting image data on each customer from the customer image database;
- allowing the display to display a customer image included in the customer image data selected from the customer image database;
- accepting a declaration of association between the trajectory data and the customer image data; and
- storing, upon accepting the association declaration, identification information on transaction data manageably stored in association with the customer image data selected from the customer image database, in association with identification information on the trajectory data selected from the trajectory database.

12. The non-transitory computer readable medium of claim 11, wherein one of the customer image data taken during a transaction checked out within a preset time after the image taking time of the selling space image data selected from the selling space image database is selected and displayed on the display.

* * * * *